June 11, 1968  F. T. JASKOWIAK  3,387,682
AUTOMOBILE ENGINE SUSPENSION
Filed Oct. 24, 1965
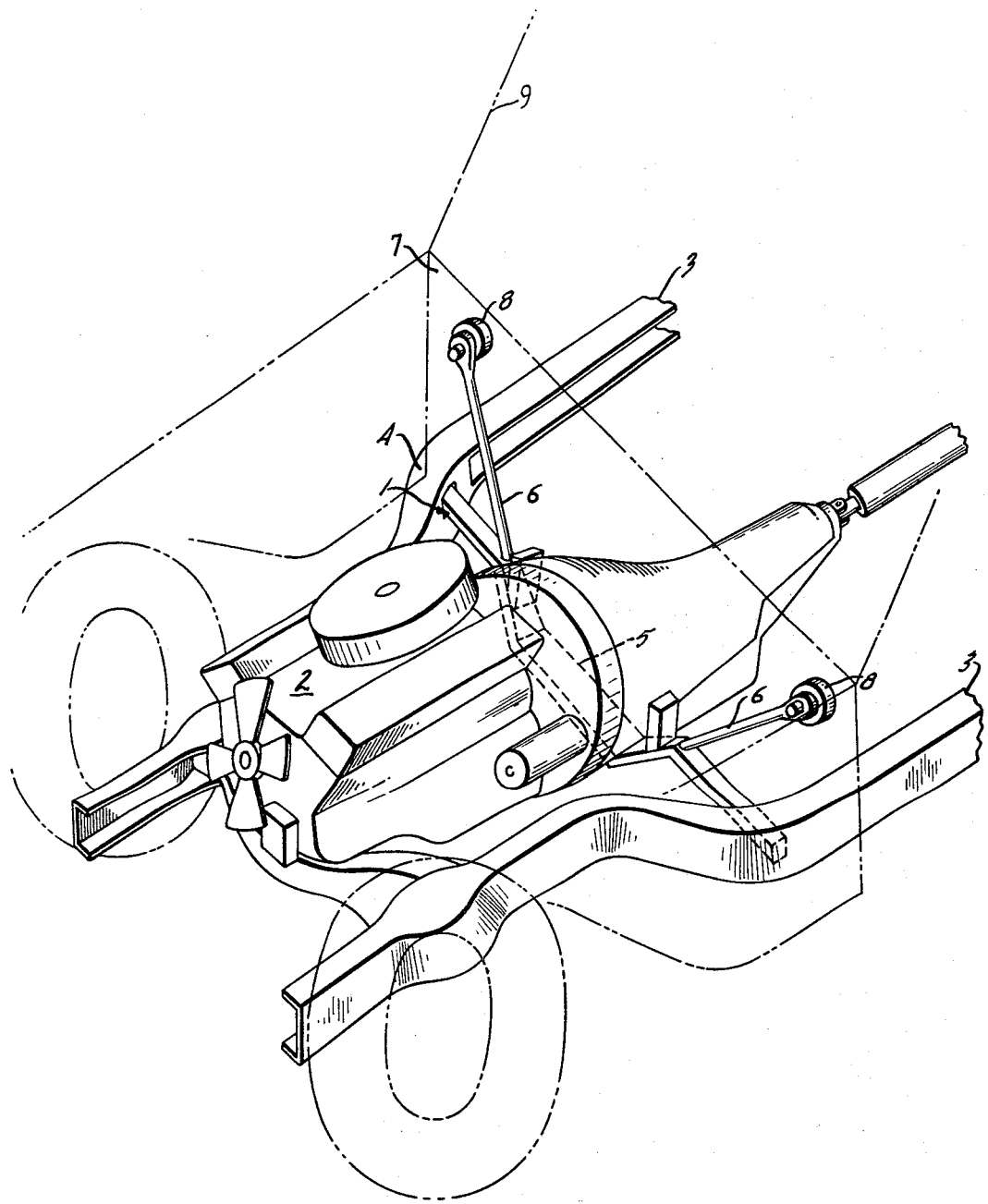
INVENTOR
FRANK T. JASKOWIAK
BY
Howard J. Barnett
ATTORNEY 3,387,682
AUTOMOBILE ENGINE SUSPENSION
Frank T. Jaskowiak, Milwaukee, Wis., assignor to A. O. Smith Corporation, Milwaukee, Wis., a corporation of New York
Filed Oct. 24, 1965, Ser. No. 504,653
2 Claims. (Cl. 180—64)

ABSTRACT OF THE DISCLOSURE

An automobile suspension which includes a pair of side frame members extending longitudinally of a vehicle body. The engine is supported at the forward end by a substantial cross frame. The rear end of the engine is supported by a relatively light cross bar which includes a metal saddle section which dips beneatth the engine and which is interconnected at its ends to the respective longitudinal frame members. A pair of strut rods are secured to the light cross bar immediately adjacent each side of the engine. Each strut rod extends diagonally upwardly and outwardly from the cross bar and has its outer end secured to the fire wall of the vehicle body through a rubber isolator member.

---

This invention is directed to an automobile engine suspension, and more particularly, to a reinforced engine support for a perimeter frame vehicle having a relatively heavy engine and transmission and a relatively light frame.

The tendency in recent passenger vehicles designed for mass production has been to increase engine horsepower for customer appeal, while frame size and weight have been progressively decreased to cut manufacturing costs. The point of "no return" is soon reached, in which the frame is not strong enough to support the large, powerful engine so popular with passenger vehicle purchasers.

This invention provides a means for satisfying the requirement of heavy engines in light vehicles by providing additional auxiliary cushioned support means for the engine and transmission.

The drawing illustrates the best mode presently contemplated in carrying out the invention. The drawing is a perspective view of the front end of a vehicle with parts broken away and parts shown in phantom to show the relationship of the engine suspension to the other vehicle parts. As shown in the drawing, the mounting means of the invention comprises a relatively light engine rear support crossbar 1 disposed below the rear portion of the vehicle engine 2, and connected to the frame 3 at the outer hip 4. The crossbar 1 includes a middle saddle portion 5 which dips under the engine 2. A pair of strut rods 6 extend diagonally upwardly from the crossbar 1 at each side to connect to the vehicle firewall 7, shown in phantom, through rubber isolators 8. The strut rods 6 do not carry static loads, but provide excellent dynamic vibration damping to isolate the vehicle body 9, shown in phantom, from vibrations created due to the excessive mass of engine 2, when the vehicle is in motion.

The engine support system of the invention allows torsional frame flexure without disturbing the engine, permits the use of short coupled engine mountings yielding more floor freedom, and eliminates the need for inboard hip mounts in the floor of the vehicle, plus the associated brackets.

Various modes of carrying out the invention are contemplated as being within the scope of the following claims particularly pointing out and distinctly claiming the subject matter which is regarded as the invention.

I claim:

1. In a low ground clearance vehicle having a body, an engine, and a wide hipped frame having a narrow front portion supporting said engine and a wider intermediate portion, an auxiliary support means for said engine comprising a cross bar extending transversely under said engine and connected at each end to the front end of the intermediate portion of said frame, and a pair of strut members connected to said cross bar at the opposite sides of the engine and adjacent the portions of the cross bar extending under said engine, said strut members each extending diagonally outward and upwardly above said cross bar and connecting through resilient damping material to said body, whereby the engine mass relative to the frame may be increased without increasing frame size and weight, and torsional frame flexure is possible without disturbing the engine.

2. An engine suspension system for a low ground clearance passenger vehicle having a body, a relatively lightweight frame, and a relatively heavy engine, said suspension comprising a pair of parallel side rails extending fore and aft of the longitudinal axis of said vehicle and offset outwardly from said vehicle engine, said side rails defining a frame having a narrow front portion and a wide intermediate portion, a plurality of cross bars extending transversely under said vehicle engine between said side rails to provide complete static load support for the engine, a pair of struts secured one to each side of the engine and secured at their lower ends to one of said cross bars which is disposed at the forward end of the wide intermediate portion, said struts each extending diagonally substantially upward and outwardly from said cross bar to connect to the front fire wall of the vehicle body, and resilient vibration isolating means disposed between the connections of said struts to said fire wall to substantially isolate the vehicle body from vibrations generated through the oscillation of the engine mass during operation of the vehicle, and to allow torsional frame flexure without disturbing the engine suspension during travel of said vehicle over irregular terrain.

References Cited

UNITED STATES PATENTS

| | | | |
|---|---|---|---|
| 1,834,879 | 12/1931 | Trott | 180—64 |
| 2,020,597 | 11/1935 | Appel | 180—64 |
| 2,063,064 | 12/1936 | Trott et al. | 248—7 |
| 2,080,435 | 5/1937 | Paton | 180—64 |
| 2,257,630 | 9/1941 | Wahlberg et al. | 180—64 X |
| 2,817,557 | 12/1957 | Reynolds | 180—64 X |
| 3,005,608 | 10/1961 | Andrews et al. | |
| 3,115,945 | 12/1963 | Dry et al. | 180—64 X |

BENJAMIN HERSH, *Primary Examiner.*

MILTON L. SMITH, *Examiner.*